(12) United States Patent
Idera

(10) Patent No.: US 8,411,198 B2
(45) Date of Patent: Apr. 2, 2013

(54) ELECTRONIC APPARATUS WITH HOLDING STRUCTURE OF DISPLAY PANEL

(75) Inventor: Shuichi Idera, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 239 days.

(21) Appl. No.: 12/700,421

(22) Filed: Feb. 4, 2010

(65) Prior Publication Data

US 2010/0202104 A1 Aug. 12, 2010

(30) Foreign Application Priority Data

Feb. 12, 2009 (JP) ................................. 2009-029400

(51) Int. Cl.
*H04N 5/225* (2006.01)
(52) U.S. Cl. .................... 348/374; 348/373; 361/679.01
(58) Field of Classification Search .................. 348/374, 348/373; 361/679.01
See application file for complete search history.

(56) References Cited

U.S. PATENT DOCUMENTS

| | | | |
|---|---|---|---|
| 6,445,417 B1 * | 9/2002 | Yoshida et al. ............... | 348/374 |
| 6,731,341 B1 * | 5/2004 | Uchiyama ..................... | 348/374 |
| 7,405,777 B2 | 7/2008 | Shimizu | |
| 2002/0015592 A1 * | 2/2002 | Kawamura et al. ........... | 396/323 |
| 2005/0030419 A1 * | 2/2005 | Kikuchi ......................... | 348/375 |
| 2005/0270396 A1 * | 12/2005 | Miyashita et al. ....... | 348/333.01 |
| 2006/0114348 A1 * | 6/2006 | Fujii et al. ..................... | 348/373 |

FOREIGN PATENT DOCUMENTS

JP 2005-189512 7/2005

\* cited by examiner

*Primary Examiner* — Usman Khan
(74) *Attorney, Agent, or Firm* — Cowan, Liebowitz & Latman, P.C.

(57) ABSTRACT

The electronic apparatus includes an exterior member covering a main body, a protection plate installed to a display window formed in the exterior member, a display panel disposed between the main body and the exterior member and including a display portion and a driving circuit provided in an outer peripheral portion of the display panel, a frame fixed to the main body and holding the display panel, and a reinforcing member fixed to the main body and supporting the exterior member at a position closer to the exterior member than the display panel and the frame. The driving circuit is disposed between a first end of the reinforcing member and a second end of the protection plate in a first direction along the exterior member so as not to overlap with the first and second ends in a second direction extending between the main body and the exterior member.

6 Claims, 3 Drawing Sheets

ELECTRONIC APPARATUS WITH HOLDING STRUCTURE OF DISPLAY PANEL

BACKGROUND OF THE INVENTION

1. Field of the Invention

The present invention relates to an electronic apparatus equipped with a display panel, and in particular to a holding structure of the display panel for the electronic apparatus.

2. Description of the Related Art

Electronic apparatuses such as digital cameras and portable devices are provided with a display panel such as a liquid crystal panel or an organic electroluminescence (EL) display to enable watching of images and displaying of information. Although miniaturization of the electronic apparatus is required, enlargement of the display panel is also required. Therefore, it is necessary to form a large display window (display opening) with respect to the size of an exterior member of the electronic apparatus. Such a large display window decreases rigidity of a peripheral portion around the display window of the exterior member, which makes it easy for the exterior member to be deformed due to an external force.

Japanese Patent Laid-Open No. 2005-189512 discloses an electronic apparatus which prevents damages of a display panel due to an external force applied to a periphery around a display window. In this electronic apparatus, a cushion member is provided between an outer peripheral portion of the display panel and an exterior member, and a notched portion formed at one side of the display window in the exterior member disperses the external force to suppress deformation of the exterior member.

On the other hand, display panels integrally provided with a driving circuit (display driving circuit) which drives the display panel in its outer peripheral portion more outside than its display portion (display surface) are generally used for the electronic apparatuses.

In the electronic apparatus disclosed in Japanese Patent Laid-Open No. 2005-189512, when a large external force is applied locally to the exterior member, the external force may be transmitted to the outer peripheral portion of the display panel through the cushion member. Moreover, an edge of the display window of the exterior member may come in contact to the outer peripheral portion of the display panel.

SUMMARY OF THE INVENTION

The present invention is directed to an electronic apparatus having a display panel holding structure capable of protecting a display driving circuit provided in an outer peripheral portion of a display panel even when an exterior member is deformed due to a large external force.

The present invention provides as one aspect thereof an electronic apparatus including a main body, an exterior member configured to cover the main body, a protection plate installed to a display window formed in the exterior member, a display panel disposed between the main body and the exterior member and configured to include a display portion and a driving circuit provided in an outer peripheral portion more outside than the display portion, a frame fixed to the main body and configured to hold the display panel, and a reinforcing member fixed to the main body and configured to support the exterior member at a position closer to the exterior member than the display panel and the frame. The driving circuit is disposed between a first end of the reinforcing member and a second end of the protection plate in a first direction extending along an inner surface of the exterior member so as not to overlap with the first and second ends in a second direction extending between the main body and the exterior member.

The present invention provides as another aspect thereof an electronic apparatus including a display panel configured to include a display portion and a driving circuit provided in an outer peripheral portion more outside than the display portion, a frame configured to cover the outer peripheral portion of the display panel and include an opening portion exposing the driving circuit without covering the driving circuit, a reinforcing member configured to cover at least one side of the frame and expose the driving circuit without covering the driving circuit, a protection plate configured to cover the display portion of the display panel and expose the driving circuit without covering the driving circuit, and an exterior member configured to cover the reinforcing member and the driving circuit.

Other aspects of the present invention will be apparent from the embodiments described below with reference to the drawings.

DESCRIPTION OF THE PREFERRED EMBODIMENTS

Exemplary embodiments of the present invention will be described hereinafter with reference to the accompanying drawings.

Figure 6:
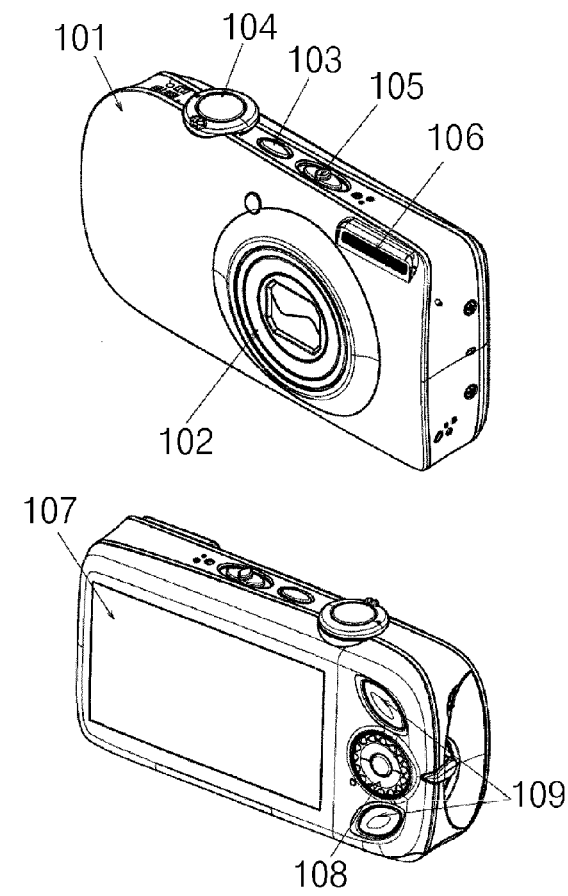
FIG. 6 is a perspective view of the camera of the embodiment.

FIG. 6 shows a compact digital still camera (electronic apparatus) that is an embodiment of the present invention. Hereinafter, the compact digital still camera is simply referred to as "camera". The upper figure of FIG. 6 is an oblique front-side external view of the camera, and the lower figure thereof is an oblique back-side external view of the camera.

In FIG. 6, reference numeral 101 denotes a case which is an exterior member of the camera, and reference numeral 102 denotes a lens barrel housing an image-taking optical system thereinside. Reference numeral 103 denotes a power supply button, and reference numeral 104 denotes a release button. Reference numeral 105 denotes a mode lever to set various modes such as image pickup modes. Reference numeral 106 denotes a light-emitting window of a flash unit.

Reference numeral 107 denotes a protection plate which is a transparent plate. The protection plate 107 is installed to a display window (opening portion) formed in a back face of the case 101 and covers a display portion (display surface) of a display panel disposed inside the case 101. The display panel displays images generated by using an image pickup element which will be described later and various information relating to image pickup operations. A user can see the images and the information through the protection plate 107.

Reference numeral 108 denotes an operation dial rotatable and pushable in upper, lower, left and right directions. Reference numeral 109 denotes operation buttons to set or select various functions of the camera.

Although not shown in FIG. 6, the case 101 houses a control circuit controlling whole operations of the camera, the image pickup element such as a CCD sensor or a CMOS sensor which photoelectrically converts an object image formed by the image-taking optical system, and an image processing circuit which generates image data using output signals from the image pickup element. The case 101 further houses a detachable battery which supplies power necessary for the operations of the camera, and a detachable recording medium such as a semiconductor memory which records the image data. Moreover, the case 101 houses a main frame (or a chassis) which forms a main body of the camera and is used as a holding base for devices such as the image pickup element, the lens barrel, a CPU, the display panel and a battery housing part.

Figure 3:
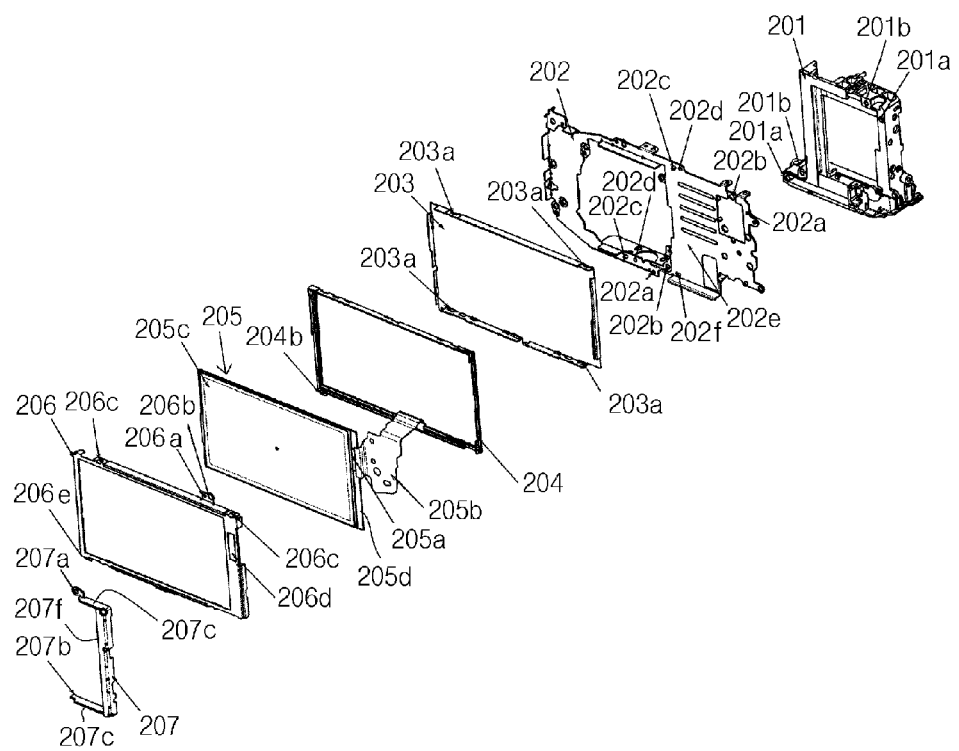
FIG. 3 is an exploded perspective view of the display panel holding structure in the embodiment.
Figure 4:
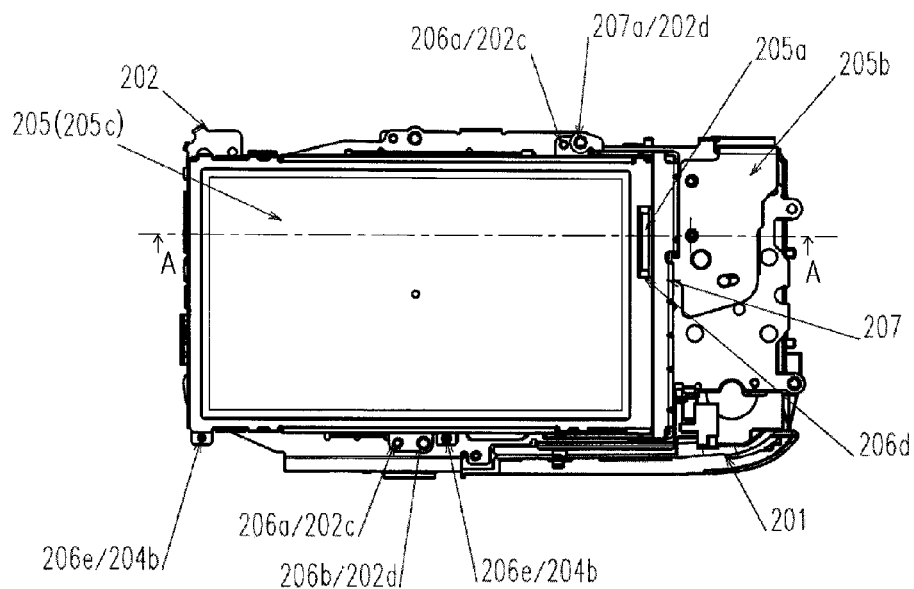
FIG. 4 is a back view of the display panel holding structure in the embodiment.
Figure 5:
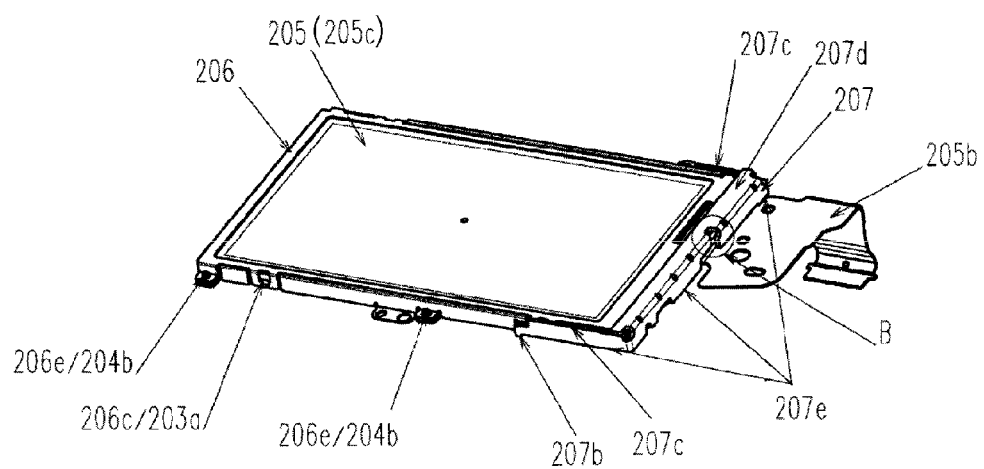
FIG. 5 is a perspective view of the display panel holding structure in the embodiment.

FIGS. 3, 4 and 5 show a display panel holding structure in the camera of this embodiment. FIG. 3 is an exploded perspective view of the display panel holding structure, FIG. 4 is a back-side view (display surface-side view) of the display panel holding structure, and FIG. 5 is an oblique display surface-side view of the display panel holding structure.

Reference numeral 202 denotes the above-mentioned main frame, and reference numeral 201 denotes the above-mentioned battery housing part in which the battery is housed. The battery housing part 201 is positioned with respect to the main frame 202 by insertion of protrusions 201a formed in the battery housing part 201 into holes 202a formed in the main frame 202. The battery housing part 201 is fixed to the main frame 202 by screws inserted into holes 202b formed in the main frame 202 and holes 201b formed in the battery housing part 201 and tightened.

Reference numeral 205 denotes the above-mentioned display panel. The display panel 205 includes the above-mentioned display portion (display surface) 205c formed by a liquid crystal panel, an organic EL panel or the like, and a driving circuit (display driving circuit) 205a which drives the display portion 205c.

The driving circuit 205a is mounted on a display surface-side surface of part of an outer peripheral portion 205d which is formed more outside than the display portion 205c. The driving circuit 205a is constituted by, for example, a driver IC formed by using a low temperature polysilicon transistor. The driving circuit 205a is connected with a flexible substrate 205b which is connected with a main substrate on which the above-mentioned CPU and image processing circuit are mounted. The driving circuit 205a drives the display panel 205 to cause it to display images and information according to control signals from the CPU and image signals from the image processing circuit.

Although not shown, a backlight part constituted by a light source (LED), an optical sheet, a light guiding plate and the like is provided on a back surface side (opposite side to the display surface) of the display panel 205.

Reference numeral 204 denotes a spacer which receives (supports) the outer peripheral portion of the display panel 205 from a main frame side. The spacer 204 has plural protrusions (not shown) to form adequate clearances between the display panel 205 and the spacer 204 in upper, lower, right and left directions. Moreover, the spacer 204 is attached to a first frame 203 which will be described later while keeping an adequate clearance with the first frame 203 by two or more protrusions (not shown) formed on the spacer 204.

Reference numeral 206 denotes a second frame. The second frame 206 is disposed with respect to the display panel 205 so as to cover the outer peripheral portion 205d of the display panel 205 from a back cover side (exterior member side). The back cover will be described later. Protrusions 204b formed on the spacer 204 are inserted into holes 206e formed in the second frame 206, which positions the second frame 206 with respect to the spacer 204.

Reference numeral 203 denotes the first frame. Claws 206c formed on the second frame 206 are engaged with engaging portions 203a formed on the first frame 203, which joins the second frame 206 to the first frame 203.

Moreover, protrusions 202c formed on the main frame 202 are inserted into holes 206a formed in the second frame 206, which positions the second frame 206 with respect to the main frame 202. An opening portion 206d is formed in an area corresponding to the driving circuit 205a in a covering portion of the second frame 206, the covering portion covering the outer peripheral portion 205d of the display panel 205.

Reference numeral 207 denotes a reinforcing member which is disposed so as to cover one side of the second frame 206. The reinforcing member 207 supports the back cover at a back cover side further than the display panel 205 and the second frame 206, though described in detail later.

A protrusion 207b formed on the reinforcing member 207 is inserted into a hole 202f formed in the main frame 202, which positions the reinforcing member 207 with respect to the main frame 202. A hole 206b formed in the second frame 206 and a hole 207a formed in the reinforcing member 207 are overlapped with each other, and a screw (not shown) is inserted into these holes 206b, 207a and a tightening hole 202d formed in the main frame 202 and then tightened. This fixes the second frame 206 and the reinforcing member 207 to the main frame 202. Thus, the display panel 205 is held by the first and second frames 203 and 206 and fixed to the main frame 202.

Foot portions 207e formed on the reinforcing member 207 are brought into contact with a receiving surface 202e formed on the main frame 202.

In this embodiment, the main frame 202 is formed of a metallic material having high rigidity. However, the main frame 202 may be formed of a resin material. Although the battery housing part 201 is formed separately from the main frame 202 in this embodiment, the battery housing part 201 may be formed integrally with the main frame 202 by using a resin material. Moreover, although the first frame 203 is formed separately from the main frame 202 in this embodiment, the first frame 203 may be formed integrally with the main frame 202 by using a metallic material. Further, the main frame 202, the battery housing part 201 and the first frame 203 may be integrally formed by using a resin material.

Furthermore, although the reinforcing member 207 is formed as an independent member in this embodiment, the reinforcing member 207 may be formed as part of the main frame 202. In this case, the part serving as the reinforcing member in the main frame 202 corresponds to a reinforcing member fixed to the main frame 202. The reinforcing member 207 may be welded to the second frame 203 to form them as an integral member. The reinforcing member 207 welded to the second frame 203 in this case corresponds to a reinforcing member fixed to the main frame 202 since the second frame 203 is fixed to the main frame 202.

Figure 1:
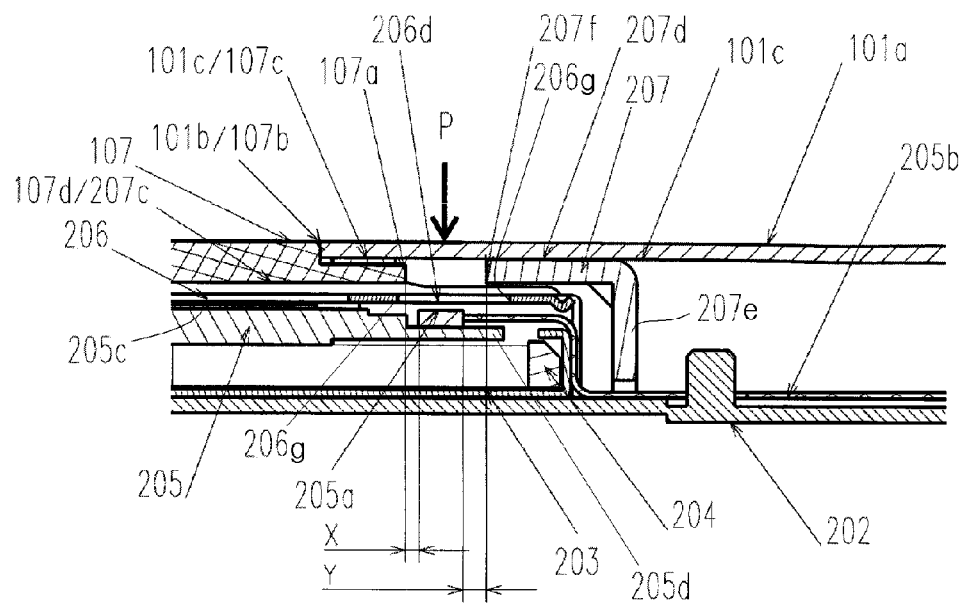
FIG. 1 is a cross-sectional view of a display panel holding structure of a camera that is an embodiment of the present invention.
Figure 2:
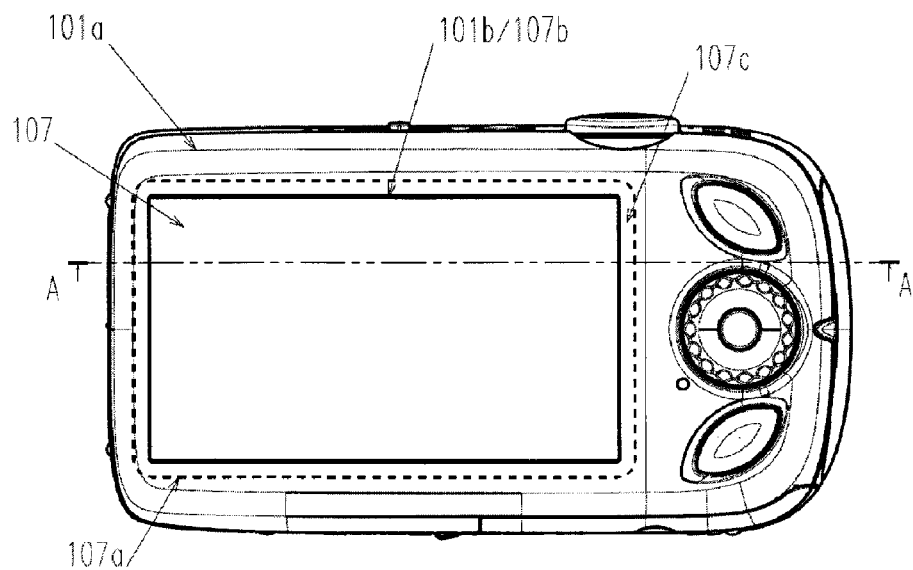
FIG. 2 is a back view of the camera of the embodiment.

FIG. 2 is an external view of the back of the camera. FIG. 1 shows a part of a section of the display panel holding structure when the camera is cut along an A-A line in FIG. 2. The A-A line corresponds to an A-A line shown in FIG. 4.

The case 101 is constituted by a front cover and the above-mentioned back cover. Reference numeral 101a denotes the back cover. The back cover 101a is disposed so as to cover the main frame 202, the display panel 205 held at a back surface side of the main frame 202 and the like, and is fixed to the main frame 202 by screws. Thus, the display panel 205 is disposed between the main frame 202 and the back cover 101a as shown in FIG. 1.

The above-mentioned protection plate 107 is installed to the display window 101b formed as an opening portion in the back cover 101a. Specifically, of the protection plate 107, a flange portion 107c formed at an area more outside than a window portion covering the display portion (display surface) 205c of the display panel 205 is attached to a back side surface 101c of a portion surrounding the display window 101b in the back cover 101a with a double-faced tape or an adhesive. A step portion 107b is formed between the window portion and the flange portion 107c of the protection plate 107. The step portion 107b engages with an inner peripheral end of the display window 101b in the back cover 101a, which positions the protection plate 107 with respect to the back cover 101a.

The reinforcing member 207 has a foot portion 207e extending from the main frame 202 toward the back cover 101a. A main frame-side end of the foot portion 207e is in contact with the receiving surface 202e of the main frame 202 as mentioned above.

Moreover, the reinforcing member 207 has a receiving portion (exterior supporting portion) 207d extending along an inner surface of the back cover 101a from a back cover-side end of the foot portion 207e toward an end (second end) 107a of the flange portion 107c in the protection plate 107. The receiving portion 207d is in contact with the inner surface of the back cover 101a to support the back cover 101a at a position closer to the back cover 101a than the display panel 205 and the second frame 206.

An end (first end) 207f of the receiving portion 207d in a direction extending along the inner surface of the back cover 101a (right and left direction in FIG. 1) faces the above-mentioned end 107a of the flange portion 107c in the protection plate 107. FIG. 1 shows a case where the receiving portion 207d is formed by bending a metal plate which is a material of the reinforcing member 207 so as to extend orthogonally from the foot portion 207e. In order to facilitate the bending of the metal plate, a notch shown in FIG. 5 by reference character B is formed in the reinforcing member 207 in this embodiment.

As shown in FIG. 3, the reinforcing member 207 has two receiving portions 207c extending in a direction orthogonal to a longitudinal direction of the receiving portion 207d (that is, a direction extending along a short side of the display panel 205) from both longitudinal direction ends of the receiving portion 207d. These receiving portions 207c are brought into contact with an inner surface 107d of the flange portion 107c of the protection plate 107 to support the protection plate 107.

The above-mentioned direction extending along the inner surface of the back cover 101a in the section taken along the thickness direction of the electronic apparatus is defined as a first direction in this embodiment. A direction extending between the main frame 202 and the back cover 101a (in other words, a vertical direction in FIG. 1, a direction of a thickness of the camera, or a direction in which the main frame 202, the display panel 205, the first and second frames 203 and 206 and the back cover 101a are stacked) is defined as a second direction in this embodiment.

As shown in FIG. 1, the driving circuit 205a provided in the outer peripheral portion 205d of the display panel 205 is disposed between the end 207f of the reinforcing member 207 (receiving portion 207d) and the end 107a of the protection plate 107 (flange portion 107c) in the first direction. Further, the driving circuit 205a is disposed so as not to overlap with the ends 207f and 107a in the second direction. In other words, both ends of the driving circuit 205a in the first direction are located more inside than the ends 207f and 107a of the reinforcing member 207 and the protection plate 107 when viewed from the second direction.

In other words, in FIG. 1, a predetermined first retreat amount Y is provided in the first direction between a reinforcing member-side end (right end in the figure) of the driving circuit 205a and the end 207f of the reinforcing member 207. The reinforcing member-side end of the driving circuit 205a corresponds to one end thereof. Therefore, the reinforcing member 207 exposes the driving circuit 205a without covering it.

Moreover, a predetermined second retreat amount X is provided in the first direction between a protection plate-side end (left end in the figure) of the driving circuit 205a and the end 107a of the protection plate 107. The protection plate-side end of the driving circuit 205a corresponds to another end thereof. Therefore, the protection plate 107 exposes the driving circuit 205a without covering it.

In addition, the opening portion 206d is formed in the area corresponding to the driving circuit 205a in the second frame 206 as mentioned above. The driving circuit 205a is disposed between inner end faces 206g facing each other of the opening portion 206d in the first direction so as not to overlap with the inner end faces 206g in the second direction. Retreat amounts of the inner end faces 206g from the reinforcing member-side end and the protection plate-side end of the driving circuit 205a in the first direction are larger than the retreat amounts X and Y of the ends 207f and 107a of the reinforcing member 207 and the protection plate 107.

In the display panel holding structure thus configured, strength for an external force P which is applied locally to the back cover 101a as shown in FIG. 1 is ensured as follows.

When the external force P is small, rigidity of each of the back cover 101a and the protection plate 107 prevents transmission of the external force P to the display panel 205.

When the external force P is larger than such a small external force, the external force P is separated into a component which is transmitted to the main frame 202 through the back cover 101a and the receiving portion 207d of the reinforcing member 207 and a component which is transmitted to the main frame 202 through the protection plate 107 and the receiving portion 207c of the reinforcing member 207.

When the external force P is further larger, the back cover 101a is bent (deformed), and the receiving portion 207d of the reinforcing member 207 and the flange portion 107c of the protection plate 107 approach the display panel 205 (outer peripheral portion 205d). However, the retreat amounts X and Y are set as mentioned above, the receiving portion 207d (end 207f) of the reinforcing member 207 and the flange portion 107c (end 107a) of the protection plate 107 do not press the driving circuit 205a directly. Therefore, damages of the driving circuit 205a can be prevented.

Further, providing the opening portion 206d in the second frame 206 and also setting the above-mentioned retreat amounts for the inner end faces 206g of the opening portion 206d can prevent the second frame 206 deformed by being pushed by the reinforcing member 207 toward the driving circuit 205a from pressing the driving circuit 205a.

The above embodiment described the case where a portion like the receiving portion 207d extending along the inner surface of the back cover 101a is formed in the reinforcing member 207. However, a portion corresponding to the foot portion 207e may be brought into contact with the back cover 101a without forming a portion extending along the back cover 101a. In this case, a driving circuit-side end of the portion corresponding to the foot portion 207e corresponds to the first end.

Moreover, although the above embodiment described the case where the reinforcing member 207 is produced by bending a metal plate, the reinforcing member may be produced by other methods such as drawing processing of a metal plate.

Furthermore, although the above embodiment described the compact digital still camera equipped with the display panel holding structure, alternative embodiments of the present invention include various image pickup apparatuses such as a single lens reflex camera and a video camera. In addition, alternative embodiments of the present invention include not only image pickup apparatuses but also various electronic devices having a display panel.

According to the above embodiment, the reinforcing member can suppress the deformation of the exterior member when an external force is applied to the periphery of the display window in the exterior member. Moreover, even when the reinforcing member and the protection plate are deformed or displaced with the exterior member due to a larger external force, the configuration of the embodiment can prevent the ends of the reinforcing member and protection plate from directly pressing the driving circuit provided in the outer peripheral portion of the display panel. Therefore, the driving circuit can be protected from such a large external force.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Patent Application No. 2009-029400, filed on Feb. 12, 2009, which is hereby incorporated by reference herein in its entirety.

What is claimed is:

1. An electronic apparatus comprising:
   a display panel configured to include a display portion and a driving circuit provided in an outer peripheral portion more outside than the display portion;
   a frame configured to cover the outer peripheral portion of the display panel and include an opening portion exposing the driving circuit;
   a reinforcing member configured to overlap the frame;
   a protection plate configured to overlap the display portion of the display panel; and
   an exterior member configured to cover the reinforcing member and the driving circuit,
   wherein a first end of the reinforcing member in the direction extending toward the protection plate faces a second end of the protection plate,
   wherein the first end of reinforcing member does not overlap the driving circuit in a direction extending toward the protection plate, and
   wherein the second end of the protection plate does not overlap the driving circuit.

2. An electronic apparatus according to claim 1, wherein the first end of the reinforcing member is disposed at a position retreating from one end of the driving circuit by a first amount, and the second end of the protection plate is disposed at a position retreating from another end of the driving circuit by a second amount.

3. An electronic apparatus according to claim 1, wherein the extending portion supports the exterior member.

4. An electronic apparatus according to claim 1, wherein the driving circuit drives the display panel to cause it to display images and information, and wherein the driving circuit is mounted on a display surface-side surface of part of the outer peripheral portion.

5. An electronic apparatus according to claim 1, wherein the exterior member has a window portion, and wherein the protection plate is positioned by the window portion.

6. An electronic apparatus according to claim 1, wherein a flange portion is formed on the protection plate, and wherein the flange portion is attached to a portion surrounding the window portion.

\* \* \* \* \*